Patented Aug. 23, 1927.

1,640,182

UNITED STATES PATENT OFFICE.

NATHAN MINTON CREGOR, OF LOS ANGELES, CALIFORNIA, ASSIGNOR TO WARD BAKING COMPANY, OF NEW YORK, N. Y., A CORPORATION OF NEW YORK.

PROCESS FOR MAKING FOOD PRODUCTS.

No Drawing. Application filed August 20, 1924. Serial No. 733,158.

The present invention relates primarily to the manufacture of a food product rich in vitamins available for widely extended use in domestic and commercial arts and industries having to do with alimentation and nutrition, and has to do particularly with an improvement and modification over the process disclosed in the patent of Charles Hoffman, Harry Davett Grigsby and Nathan Minton Cregor, No. 1,541,263 of June 9, 1925, assigned to the assignee of the present application.

In its preferred form the product consists of a sugary material high in mineral salts, which material serves as a carrier for a rich content of vitamine associated with it. The ultimate product is devoid of starch, all of the starches having been converted into soluble sugars. A particular merit of the manufacture is that the product is produced from cereal germs such as for instance, wheat germs, corn or maize germs and rice germs. These cereal germs constitute by-products of milling processes and may be obtained cheaply on the market in quantity. The ultimate product is preferably a dry solid in powder form of yellowish brown color and having a sweet malty taste. The product is fully described in the application of Charles Hoffman for food product filed concurrently herewith.

In the main the process consists of the malt digestion of cooked oil free wheat, corn or rice germs. After the germs have been freed from their oily content, they are cooked in water until the starch contained in the mass is thoroughly gelatinized. The cooked material is then treated with an infusion of malt and is maintained at suitable temperatures for an appropriate length of time in order to permit digestion of the mass and conversion of the starches into soluble sugars. The cooked and malted mass is then filtered to separate out the liquor, after which the liquor is concentrated. This process as briefly outlined corresponds to the process described in the Patent No. 1,541,263 above referred to.

In order to reduce the product to dryness the malted liquor is concentrated under reduced pressure to a desired syrupy consistency and this syrup is then dried in suitable dryers until the product is substantially free from moisture. In conducting the process as above outlined, it was found to be difficult to successfully concentrate the extract and reduce it to dryness when the operation is carried out on a commercial scale. Commercial dryers employed for concentrating extracts to dryness commonly consist of rotating drums heated by appropriate means and maintained at a suitable sub-atmospheric pressure. When the vitamin containing extract was treated in the drum dryers, foaming of the product occurred to such an extent that proper concentrating and drying was difficult. A second source of difficulty was the gumming of the syrup as it became more concentrated, with the result that the drying surface of the drum dryer became coated with a gummy layer of the concentrated product which adhered to the drum surface and rendered successful operation of the machine impossible until the drum was cleaned.

It is a principal object of this invention to provide a process for the production of the vitamin containing product herein referred to which avoids the difficulty of foaming and gumming in the concentrating and drying apparatus.

The process of the present invention successfully eliminates these difficulties and provides a satisfactory means of producing the product on a commercial scale.

In the process as heretofore conducted, the malt digestion of the cooked cereal germs was permitted to continue until all of the starch of the product was converted into soluble sugars. At the end of the malt digestion step, the product was tested for starch and if starch were present the digestion was permitted to continue until such test indicated that no undigested starches remained. After extended investigation as to the possible causes of the foaming and gumming in the concentrating and drying apparatus, it was found that after the liquor had been concentrated to a thick syrup, it frequently responded vigorously to the starch test and apparently was possessed of an appreciable starch content. By the process of this application the starch content of the concentrated syrup is eliminated.

As a result of experimentation, it was found that the presence of starch in the concentrated syrup could not be eliminated by the malting process which we had heretofore employed. The starch content of the concentrated syrup was noticeable regardless of how thoroughly the malting operation was conducted. Permitting the malt digestion to continue for a greater length of time did not alter the situation nor did the use of larger quantities of malt during the malt digestion step. To overcome this difficulty and relieve the concentrated product of its starch content, the invention contemplates a second malt digestion step to be conducted subsequent to the first malt digestion step and after the material has been boiled subsequent to the first malt digestion. Experimentation has led to the belief that unruptured starch cells are still present in the mash after the first malt digestion, which cells, being unruptured do not respond to the starch iodine test. However, after the final boiling immediately preceding filtration of the mash, these starch cells are probably freed and ruptured and pass along into the filtrate and give a positive test in the evaporated syrup. While the correctness of this explanation is not insisted upon, the fact is that the syrup after the first malt digestion step was found to exhibit a positive starch test and that by means of the second malt digestion step as contemplated by this invention, the starch content of the syrup is eliminated and the consequent difficulty of foaming and gumming in the evaporating apparatus is overcome.

The second malt digestion step as contemplated by this invention may be introduced into the process at any one of several stages. After the first malting operation the mash is boiled and is then subjected to the filtration process. The second malt infusion may be added after this final boiling which follows the first malt digestion and immediately precedes the filtration step. The second malt infusion may equally well be added immediately after filtration of the mash and just prior to concentration of the syrup. If desired, however, the extract may be concentrated to a syrupy consistency and the second malt infusion added to the concentrated liquor in the evaporating apparatus. The process may successively be carried out to effect removal of starches from the product and to eliminate foaming and gumming troubles by adding the second malt infusion at any one of the three stages of the process just described, and therefore the invention contemplates the introduction of the second malt digestion step at any of these stages.

In carrying out our improved process of producing a food product rich in vitamins, cereal germs, preferably wheat germs, Indian corn or maize germs or rice germs are employed as the raw materials. These cereal germs are first treated to remove from them their oily content. This is acomplished by treating the germs with benzol or carbon tetrachloride, each of which is available economically because of its low cost, efficiency and ready regeneration. It is essential to the production of our product that the germs be treated for the removal of their oily constituents. The oil extraction step also accomplishes the useful function of removing a substantial amount of the coloring matter from the raw materials and at the same time extracting certain bitter principles which might tend to impart an unpleasant taste to the ultimate product.

The oil free germs are then cooked in water to gelatinize the starch of the germs. A quantity of say 2,500 pounds of oil free germ (for instance wheat germ) may be cooked with say 1,100 gallons of water at an initial temperature of 104° F. The mass is then heated to the boiling point and subsequently subjected to a pressure of substantially 15 pounds per square inch gauge and boiled at this pressure for about 15 minutes. It was found thru extensive experimentation that the best results for obtaining a highly nutritive ultimate product are secured by cooking the raw materials for a short time under say from 15 to 20 pounds per square inch gauge pressure rather than to cook them for a longer time under atmospheric pressure or at temperatures below atmospheric boiling point.

After the cereal germs are thoroughly cooked, the first malt infusion is added. This infusion may be prepared by mixing say 450 pounds of malt in about 250 gallons of water at 82° F. and digesting the mixture for 15 minutes at that temperature. The temperature is then raised to 100° F. and held for 15 minutes. It is then raised to 120° F. and held for another 15 minutes after which it is increased to 133° F. and held at this point until the malt infusion is used. The malt infusion is added to the cooked raw materials in a suitable mash tub. One hundred gallons of water is placed in the mash tub and the cooked cereals are then added to this water and if necessary further cold water is added to bring the mixture to a temperature of 133° F. The malt infusion is then added to the mixture in the mash tub and the entire mash is digested for 20 minutes at 133° F. Suitable means for agitating the mixture in the mash tub is provided. It is also desirable that the acidity of the mixture during malting be controlled, after the fashion disclosed in the application of Nathan Minton Cregor for "Process for making food products" filed concurrently herewith. The temperature of the mixture is then raised to 140° F. and held at that point for 40 minutes after which the temperature is increased to 148° F. and held for 15 minutes or longer if necessary to thoroughly convert the starches of the raw material so that a starch iodine test will indicate an absence of starch in the mass. The important thing is to continue the malt digestion for such length of time as is necessary to render the mass starch free, as indicated by suitable tests. The mass, brought to the boiling point, is then filtered and the resulting liquor evaporated to a syrup having a density of from 40° to 50° Balling.

A second malt infusion is prepared in the same way as was the first malt infusion except that for the second infusion a lesser amount of malt, say for instance, 50 pounds, with a correspondingly lesser amount of water, say for instance 30 gallons, is used. This malt infusion is then added to the concentrated syrup and the malt digestion permitted to continue until the concentrated syrup is free from starch. The syrup is then evaporated in the drum dryers and concentrated to dryness. It will be understood that while in the specific embodiment of the process just described, the second malt infusion is added to the concentrated liquor, it may be added to the liquor immediately after the filtration or it may be added to the mash after the final boiling which accompanies the first malt digestion.

We have found that the process disclosed in this application is entirely successful in the production of our improved product on a commercial scale. The incorporation into the process of the second malt digestion step renders the ultimate product starch free, improves the product in consistency, appearance, uniformity and flavor, greatly increases the yield and eliminates foaming and gumming difficulties in the evaporating apparatus, so that the process may readily be carried out on a commercial scale.

I claim:—

1. The method of producing a food product from cereal germs which comprises cooking the raw material until the starch present is gelatinized, treating the material to effect saccharification of the gelatinized starch and subsequently boiling and subjecting said material to a second saccharification treatment.

2. The method of producing from cereal germs a food product rich in water soluble B vitamine, which comprises extracting the oil from said germs, cooking the oil-free germs until the starch present is gelatinized, treating the material to effect saccharification of the gelatinized starch and subsequently boiling and subjecting the said material to a second saccharification treatment.

3. The method of producing a food product from cereal germs which comprises extracting the oil from said germ, saccharifying the starch of the germs by the action of malt diastase thereon, and subsequently boiling and subjecting the said product to a second saccharification treatment produced by the action of malt diastase.

4. In the production of a food product from cereal germs, the step of malting the said germs to digest the starch contained therein and subsequently boiling and subjecting the once malted liquor to a second malting operation.

5. The method of producing from cereal germs a food product rich in water soluble B vitamine, which comprises extracting the oil from the said cereal germs, cooking the material until the starch present is gelatinized, malting the material to saccharify the starch contained therein, subsequently boiling and malting the material a second time and then concentrating the resulting malted liquor.

6. The method of producting from cereal germs a food product rich in water soluble B vitamine, which comprises extracting the oil from the said germs, cooking the oil-free germs until the starch contained therein is gelatinized, malting the material to saccharify the gelatinized starch, boiling the material, filtering the resulting liquor, malting the said filtered liquor and concentrating said malted liquor.

7. The method of producing a food product from cereal germs which comprises malting the cooked material to saccharify the gelatinized starch, subjecting the malted material to boiling temperature at atmospheric pressure, filtering off the resulting liquor, malting the said filtered liquor and concentrating said malted liquor.

In testimony whereof I affix my signature.

NATHAN MINTON CREGOR.

CERTIFICATE OF CORRECTION.

Patent No. 1,640,182.  Granted August 23, 1927, to

NATHAN MINTON CREGOR.

It is hereby certified that error appears in the printed specification of the above numbered patent requiring correction as follows: Page 2, line 48, for the word "successively" read "successfully"; page 3, line 81, claim 6, for the word "producting" read "producing"; and that the said Letters Patent should be read with these corrections therein that the same may conform to the record of the case in the Patent Office.

Signed and sealed this 8th day of November, A. D. 1927.

Seal.

M. J. Moore,
Acting Commissioner of Patents.